UNITED STATES PATENT OFFICE.

NATHANIEL C. MITCHELL, OF PHILADELPHIA, PENNSYLVANIA.

ART OF RESTORING RUBBER.

SPECIFICATION forming part of Letters Patent No. 418,044, dated December 24, 1889.

Application filed September 26, 1889. Serial No. 325,193. (No specimens.)

*To all whom it may concern:*

Be it known that I, NATHANIEL C. MITCHELL, of Philadelphia, in the county of Philadelphia and State of Pennsylvania, have invented a new and useful Improvement in the Art of Restoring Rubber, which improvement is fully set forth in the following specification.

The object of the present invention is the production from waste rubber goods—as old boots and shoes, hose, belting, &c.—of a very high grade of rubber, suitable for use in the manufacture of rubber goods of the best quality.

In the ordinary process of restoring or reclaiming old rubber, the stock, after devulcanization, is disintegrated by cracker-rolls and then spread out to dry in an artificially-heated atmosphere, after which it is sheeted. I have discovered by experiment that a very remarkable effect upon the appearance and quality of the product is obtained by passing the rubber through the rolls directly after its removal from the devulcanizer; and this invention consists, mainly, in rolling the rubber stock after treatment with live steam while yet in a moist condition—that is to say, without first drying it, as has heretofore been done. The rubber produced by this process is remarkable for its homogeneity and its uniformity throughout, being free from hard lumps and inequalities that are conspicuous in the ordinary product. Further, the rubber made by the new process is characterized by great strength and elasticity and by a smooth and velvety surface, which characteristics distinguish it from restored rubber as ordinarily produced. It is not possible to obtain the same effect by simply moistening rubber after it has once been dried, and then sheeting, which is probably due to the fact that the moistening of the stock in the devulcanizer is effected under a very high pressure, and therefore the moisture is forced into all the interstices and brought into intimate contact with every particle of the mass of rubber.

It is essential, therefore, in carrying out this invention that the moisture be applied under such conditions as to permeate effectually every part of the mass of rubber. The required condition of moisture may of course be obtained by the use of water under pressure; but steam is preferred.

To produce the very best result, it is desirable to continue the rolling and sheeting by passing the rubber between successive rollers or a number of times between the same rollers until perfectly dry; but it is not always convenient or expedient to do this, and it suffices to produce an excellent grade of rubber to give the rubber three or four passes while yet moist and then spread it to dry.

In carrying out this invention the old rubber-stock is reduced by corrugated cracker-rolls to small fragments, from which particles of iron and steel are eliminated by magnetic separators. The stock is then treated to disintegrate the fiber, after which, by various washing and separating processes, the impurities and foreign substances are all removed. These preliminary steps in the operation are preferably carried on by the means described in applications for patents filed by me September 20, 1889, though, of course, any means capable of accomplishing the same result may be employed. The stock being thus cleansed is ready for devulcanization and desulphurization, which can be advantageously effected by treatment with live steam under pressure. Such process is fully set forth in my application, Serial No. 324,583, filed September 20, 1889, though it is not necessary in carrying out the present invention that the process described in said application should be followed exactly. After the steam is blown off air is drawn through the mass of rubber by means of a vacuum-pump for, say, one hour, more or less, the surplus moisture being thus removed. The stock will now be in the condition most favorable for rolling. The devulcanizer is opened and the stock removed, and immediately, while yet in its moist state, is passed between smooth-faced rolls, the rolling being preferably continued until the rubber is absolutely dried. To effect this requires about sixteen passes, making the sheeting process longer and more difficult than in dry sheeting. The rubber begins first to assume a filamentary appearance, and then the filaments unite, presenting a veil-like form, which gradually develops into a fine sheet of uniform texture, having a smooth velvety surface, presenting a marked contrast to the usual product. During all the rolling moisture and considerable muck exude from the mass, and any hard and gritty substances that may remain are also removed. The drying is assisted by the heat of the rolls, due to the great friction, which heat in this process of moist rolling becomes a useful factor, instead of being detrimental and injurious, as in the process of dry sheeting. While it is preferable to continue the rolling until the sheet is absolutely dry, an excellent result may be obtained by giving the rubber, say, four passes, and then spreading out to dry in a temperature of from 90° to 110° Fahrenheit.

In another application, Serial No. 325,898, filed October 3, 1889, I have described a mill specially designed for carrying this process into effect. It is obvious, however, that the process may be practiced by other means—as, for example, by passing the rubber repeatedly between the same pair of rolls. Moreover, the said mill may be used for other purposes. It is therefore referred to merely as an example of means whereby the present invention may be advantageously carried into effect.

The ordinary restored rubber is now a well-known commodity. A rough lumpy surface and uneven texture are its marked characteristics. Its use is confined mainly to cheap goods, such as boots and shoes.

The new rubber produced in accordance with this invention is distinguishable upon the most casual inspection by the properties and characteristics above referred to. It can be wrought into fine goods—such as waterproof coats and the like—for which the ordinary restored rubber is not available.

I claim as my invention and desire to secure by Letters Patent—

1. In the art of recovering rubber from rubber waste, the improvement consisting in rolling the rubber after devulcanization in a moist condition, substantially as described.

2. The herein-described process, consisting in subjecting rubber stock to the action of live steam under pressure, whereby the mass becomes permeated with moisture, and then rolling it while in a moist condition, as set forth.

3. The herein-described process, consisting in subjecting rubber stock to the action of live steam in a close vessel, drawing air through the mass to remove surplus moisture, and finally rolling the rubber while in a moist condition, substantially as described.

4. In the art of recovering rubber from waste articles, the improvement consisting in rolling the rubber, after treatment with live steam and while in a moist condition, until dry, substantially as described.

5. As an article of manufacture, the product of the above process, the same being a sheet of restored rubber distinguished by its elasticity, tenacity, a smooth surface, and uniform texture, substantially as hereinbefore set forth.

In testimony whereof I have signed this specification in the presence of two subscribing witnesses.

NATHANIEL C. MITCHELL.

Witnesses:
E. M. MUNDY,
BENJ. T. ALLEN.